United States Patent [19]

Stinnett et al.

[11] Patent Number: 5,669,981
[45] Date of Patent: Sep. 23, 1997

[54] VEHICLE WASHING METHOD

[75] Inventors: Michael David Stinnett; William T. Daugherty, both of Bristol, Tenn.; William W. Rambo, Abingdon, Va.

[73] Assignee: Magic Wand Inc., Bristol, Va.

[21] Appl. No.: 705,999

[22] Filed: Aug. 30, 1996

Related U.S. Application Data

[62] Division of Ser. No. 113,201, Aug. 27, 1993, Pat. No. 5,577,288.

[51] Int. Cl.⁶ .................................................. B60S 3/04
[52] U.S. Cl. .................... 134/6; 134/18; 134/25.5; 134/56 R; 134/123; 15/97.3
[58] Field of Search .................. 134/6, 9, 18, 56 R, 134/123; 15/97.3, 53.1, 53.2, 53.3, 53.4, DIG. 2

[56] References Cited

U.S. PATENT DOCUMENTS

| Re. 29,516 | 1/1978 | Genaro ................................ 15/97.3 |
| 4,057,866 | 11/1977 | Belanger . |
| 4,194,923 | 3/1980 | Johnson . |
| 4,453,284 | 6/1984 | Schleeter . |
| 4,756,040 | 7/1988 | Sereny ................................ 15/97.3 |
| 5,339,478 | 8/1994 | Schleeter ............................ 15/97.3 |
| 5,463,788 | 11/1995 | Ennis ................................... 15/97.3 |

FOREIGN PATENT DOCUMENTS 0151155  8/1985  Japan ................................ 15/97.3

*Primary Examiner*—Jeffrey Snay
*Attorney, Agent, or Firm*—Lalos & Keegan

[57] ABSTRACT

A vehicle washing system includes an arch frame that moves on rails over and along the length of a vehicle. A rack support arm is rotatively connected to a horizontal cross member of the frame and a rack with vertically depending cleaning strips is connected to the support arm. Prior to activation, the vertically depending cleaning strips are located on the side(s) of the frame so that an unobstructed vehicle entry and exit way is provided. Once activated, the cleaning strips are rotated into position in contact with the vehicle. Thereafter, the rack support arm is reciprocated to move the strips back and forth across the vehicle as the frame moves. A dual-rod cylinder provides movement of the rack support arm into an active position with the cleaning strips in contact with the vehicle and also provides the reciprocating action. A rocker panel cleaning assembly is provided to clean the sides of the vehicle as the frame moves and the rack support arm reciprocates.

9 Claims, 3 Drawing Sheets

VEHICLE WASHING METHOD

This is a divisional of application Ser. No. 08/113,201 filed on Aug. 27, 1993, now U.S. Pat. No. 5,577,288.

FIELD OF THE INVENTION

The present invention relates to vehicle washing apparatus and more particularly to a movable system that traverses along tracks while the vehicle remains stationary.

BACKGROUND OF THE INVENTION

A common arrangement in vehicle washing systems includes overhead racks that support vertically disposed cleaning strips made of cloth or other suitable material. In one type of system, the vehicle moves past the cleaning strips while the rack(s) reciprocate causing the strips to frictionally engage the vehicle at various points along its length. While the vehicle moves, the strips and/or the vehicle are sprayed with cleaning fluid or a rinse solution. One such system in which the vehicle moves while the main frame of the washing apparatus remains stationary is disclosed in U.S. Pat. No. 4,057,866 to Belanger. Another type of vehicle washing system, often called a roll over system, is one in which the vehicle remains stationary while an arch-shaped frame of the washing apparatus moves over and along the vehicle. U.S. Pat. No. 4,453,284 to Schleeter discloses one example of such system. The mobile frame traverses a track that is secured to the floor. As the frame moves along the track and over the length of the car, racks with cleaning strips depending therefrom are reciprocated back and forth to engage and clean the vehicle.

In both the stationary and roll over systems described above, the reciprocating action of cleaning strips is confined to a vertical plane that is perpendicular to the longitudinal axis of the vehicle. In these systems, the cleaning strips depending from the racks are always in the vehicle path and obstruct the view through the vehicle washing apparatus. This situation makes it difficult to drive the vehicle accurately into or through the washing apparatus.

SUMMARY OF THE INVENTION

The present invention overcomes the disadvantages of the prior art by providing a complete "see through" entry system for a roll over type vehicle washing apparatus. Before the vehicle is driven into position to be washed, the racks with cleaning strips depending therefrom are displaced to the sides of the arch or inverted U-shaped frame of the assembly. With the racks and cleaning strips in such position, i.e. parallel to the longitudinal axis of the vehicle, the vehicle can be driven into the wash assembly without an obstructed view. Once the vehicle enters the system and reaches the proper start position it activates the washing apparatus, e.g. by the front wheel riding over a treadle plate.

The racks and cleaning strips are then rotated out from the sides of the apparatus and into contact with the vehicle. Then, as the frame of the apparatus passes over the vehicle, the racks and cleaning strips are reciprocated so that they pass from one side of the vehicle and across its width to the other side. Thus, the strips pass through an arcuate path across the vehicle, and through frictional contact, clean the majority of vehicle surfaces. With such arcuate travel path the cleaning strips are better able to contact all surfaces, includes the transition surfaces at the four corners of the vehicle.

The "see through" entry system and arcuate travel of cleaning strips is provided in the present invention by a dual-rod cylinder. A first rod of the cylinder is attached to the vehicle washing frame. The second rod is attached to a drive arm that rotates a pivot shaft that is journal mounted in the horizontal cross member of the arch-shaped frame. Attached to the pivot shaft is a rack support arm. In the inactive state of the apparatus, the rack support arm is in line with the horizontal cross member and thus perpendicular to the longitudinal axis of the vehicle. The racks and depending cleaning strips are mounted on the ends of the rack support arm and are parallel to the longitudinal axis of the vehicle, and thus not in contact with the vehicle. Once the system is activated, the first rod is retracted to pull the drive arm and thus to rotate the pivot shaft. This action causes the rack support arm, the racks connected to it and the depending cleaning strips to move through a first arc to a first position where the strips contact a first portion of the vehicle. As the frame is caused to move over and along the length of the vehicle, the second rod is retracted to further rotate the pivot shaft and thus the racks and cleaning strips through a second arc to a second position. As the cleaning strips move through the second arc from their first position to their second position, they frictionally engage the vehicle along its width to clean a segment of the vehicle. As the frame continues to move over and along the vehicle, the second rod is alternately retracted and extended to reciprocate the racks and depending cleaning strips, thus cleaning different segments of the vehicle.

In a preferred embodiment of the present invention, a rocker panel cleaning assembly is located on either side of the frame. Once the vehicle is in position, these rocker panel assemblies swing into positions away from the sides of the frame and toward the vehicle. As the frame moves over and along the vehicle, a vertically upright shaft with cleaning strips connected thereto is rotated causing the strips to extend radially and into frictional contact with the sides of the vehicle. This feature provides effective cleaning of the lower side portions of the vehicle that may be missed by the rack supported vertical cleaning strips.

DETAILED DESCRIPTION

Figure 1:
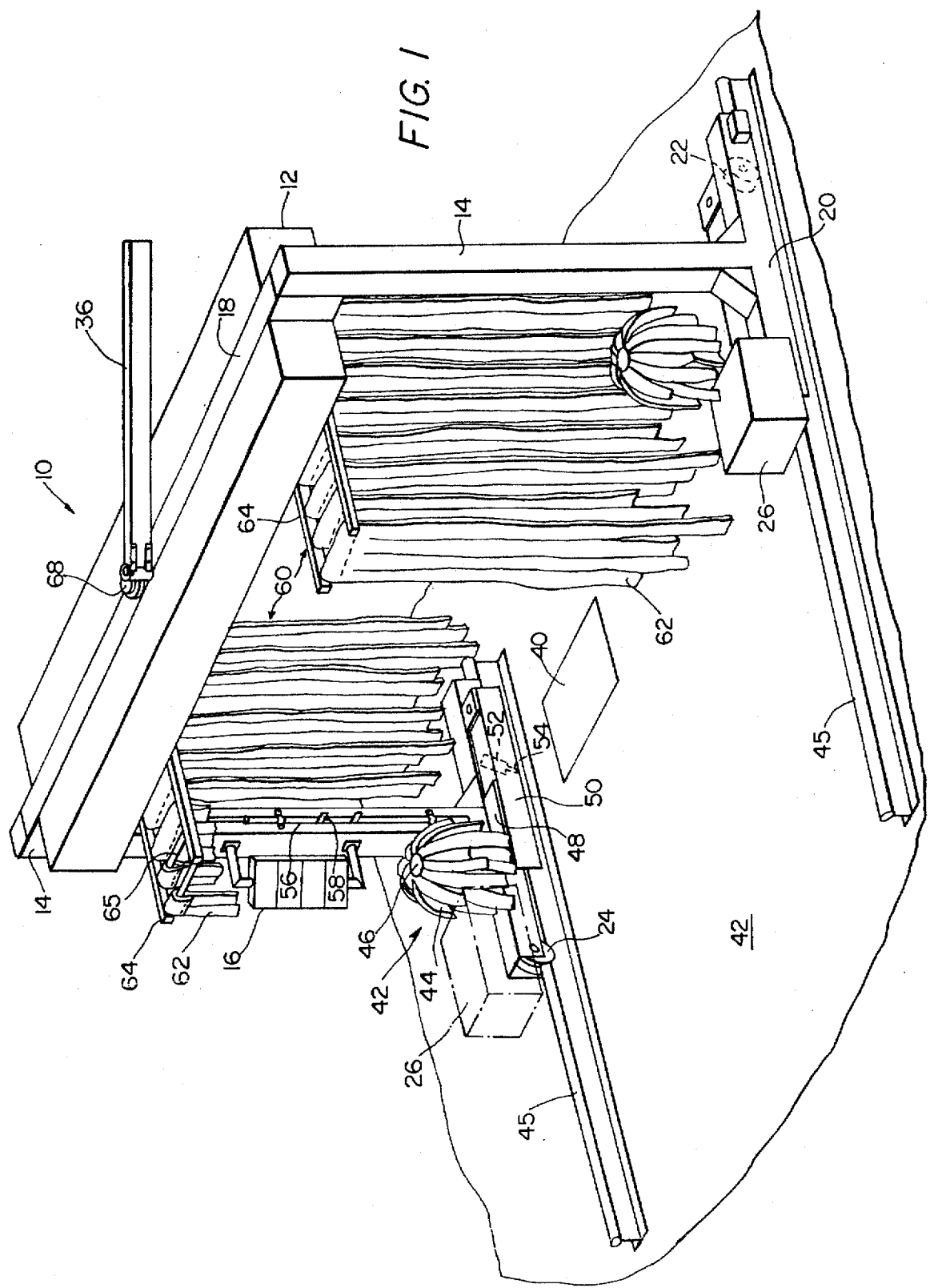
FIG. 1 is a perspective view of the vehicle washing apparatus of the present invention.

The vehicle washing system of the present invention, shown generally as 10 in FIG. 1 includes an inverted U-shaped or arch frame 12, constructed preferably of aluminum. Frame 12 consists of a pair of opposite vertical support members 14 and a horizontal cross support member 18 connected between. A display panel 16 provides the vehicle's driver with visual indicators, such as "enter", "stop", "waxing", etc. At the base of each vertical support member 14 is a bottom support member 20. Each bottom support member 20 has an idler wheel 22 and a drive wheel 24 journaled therein. For the sake of simplicity, features of the apparatus that are duplicated on both the right and left sides are shown only on one side. For example, although only one drive wheel 24 is shown (on the left side), a second drive wheel is also provided (on the right side). Each drive wheel 24 is powered by a motor shown generally as 26, which preferably is a 1 hp, 3-phase electric motor.

Figure 5:
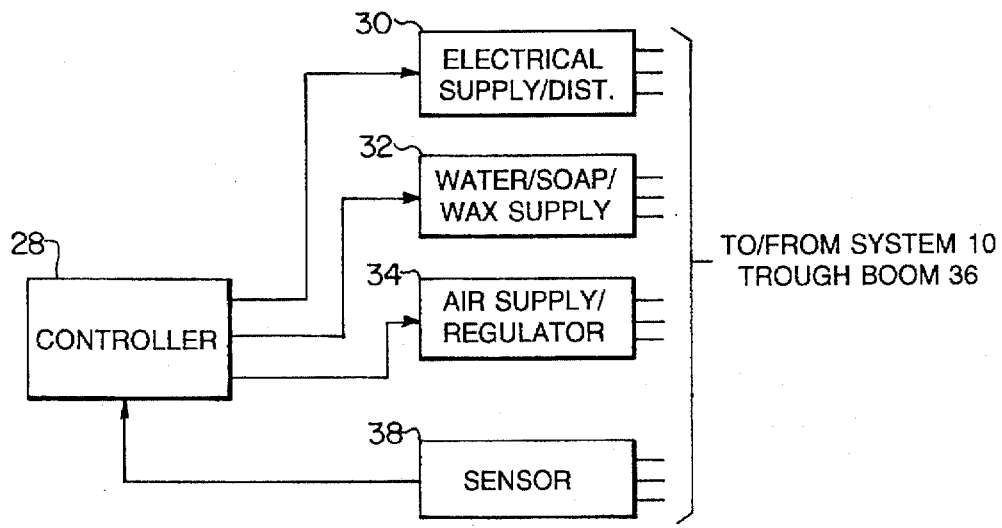
FIG. 5 is a general block diagram of control system of the present invention.

Electric motors 26 rotate drive wheels 24 to power frame 12 forwardly and rearwardly. Motors 26, as well as other components of system 10 are controlled by controller 28 (FIG. 5), which may be a conventional digital programmable computer or a conventional analog timer and relay system. Controllers for handling automatic vehicle washing systems are well known in the art and do not require a detailed description for the purpose of understanding the present invention. Basically, though, controller 28 initiates, synchronizes and regulates operations through conventional electrical supply and distribution unit 30, water/soap/wax supply and distribution unit 32, and air supply and distribution unit 34. Power, water/soap/wax and air are brought to system 10 via appropriate conduits that may be carried through an overhead compartment or ceiling and through boom 36 (FIG. 1). Inputs are fed to controller 28 from conventional sensors 38 such as a treadle plate 40 (FIG. 1) for sensing the position of the car (e.g. front wheel) when it is driven into the apparatus or a conventional photo detection system (not shown) for profiling the length of the vehicle.

Secured to a flooring 42 (FIG. 1) are two parallel rails 45 on which idler wheels 22 and drive wheels 24 ride to rotatively support frame 12 as it moves back and forth over a vehicle. Mounted on each bottom support member 20 is a rocker panel cleaning assembly 42. Assembly 42 includes a number of cleaning strips 44, made of cloth or other suitable material, connected to a rotatable vertical shaft 46. Shaft 46 is driven by a motor shown generally at 48, which is preferably a 1 hp, 3-phase electric motor. Cleaning strips 44 hang vertically on shafts 46 until the shafts are rotatively driven by motors 48, at which time strips 44 spin with rotating shafts 46 and radially extend out and away from shafts 46. Shafts 46 and coupled motors 48 are mounted on swing arms 50 that in turn are pivotally connected to bottom supports 20. Swing arms 50 are swung away from bottom supports 20 and toward the vehicle under the action of cylinders 52, which are preferably air cylinders. Each cylinder 52 is pivotally mounted on a bottom support 20 with its piston rod 54 pivotally connected to swing arm 50. During the active states of the vehicle washing apparatus (i.e. washing, rinsing or waxing cycles), piston rods 54 are extended to move swing arms inwardly toward the vehicle. As shafts 46 are rotated, the spinning and radially extending cleaning strips 44 frictionally engage the vehicle side rocker panels. Cleaning and rinsing solutions are delivered through appropriate conduits extending through boom 36 and are sprayed onto the vehicle via manifolds 56 that extend around frame 12 and are attached to support members 14 and 18. Nozzles 58 are directed outwardly from manifolds 56 and toward the vehicle.

The top and upper body surfaces of the vehicle are cleaned by upper washer assembly 60. Upper washer assembly 60 includes a number of long, vertically hung cleaning strips 62 made of a material that is the same or similar to rocker panel cleaning strips 44, i.e. cloth or the like. Cleaning strips 62 are suspended on racks 64. The preferred embodiment includes two racks 64, one each connected on opposite ends of a rack support arm 66 (shown best in FIG. 3). Racks 64 include a number of spaced suspension bars 65 that effectively space strips 62 across the width of the vehicle as the strips pass over it. The lower ends of strips 62 are maintained above floor level (FIG. 1) but their height may be varied among the group of strips to vary the surface contact with the vehicle to ensure a more effective cleaning action.

Figure 2:
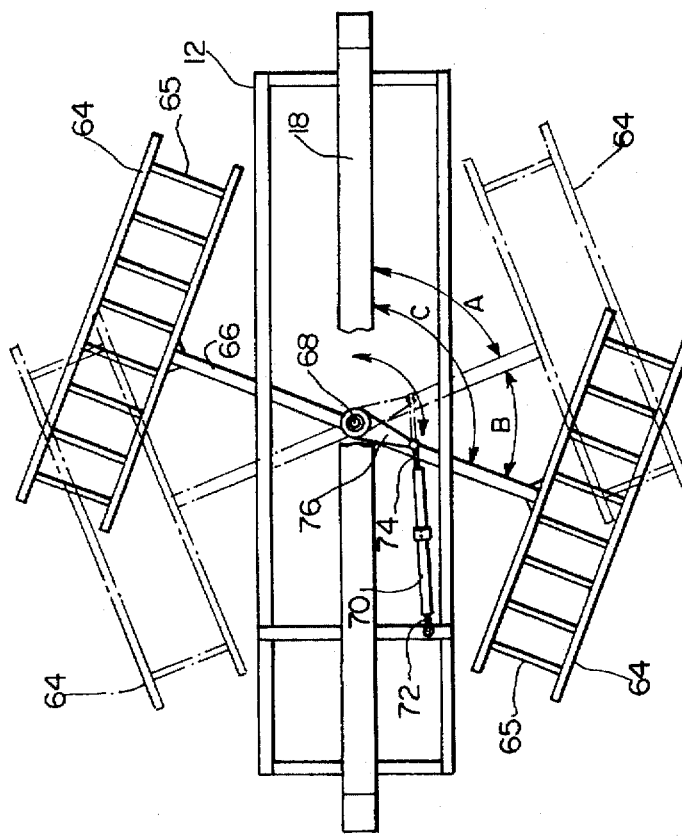
FIG. 2 is a top plan view of a segment of the vehicle washing apparatus showing the relative position of the overhead racks before a washing sequence is started.
Figure 3:
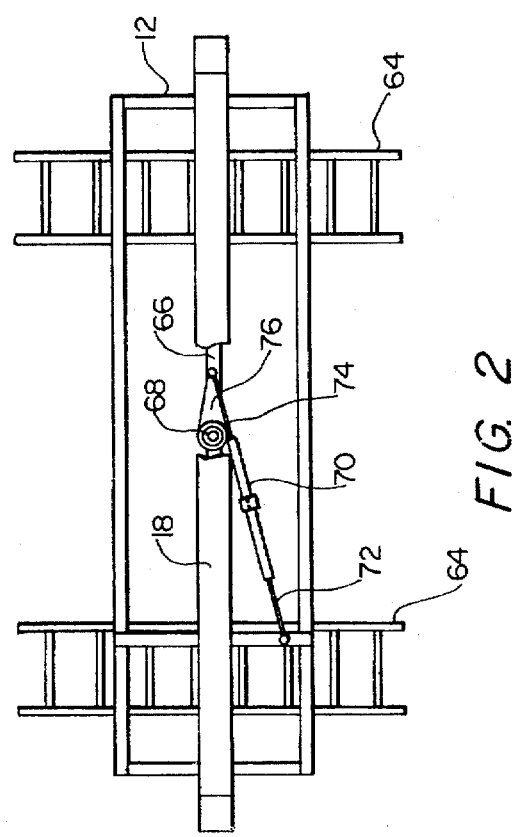
FIG. 3 is a top plan view similar to FIG. 2 but showing the relative positions of the overhead racks during an active washing cycle of the apparatus.

Upper washer assembly 60 is rotatively suspended from frame 12. Rack support arm 66 is mounted to pivot shaft 68 which is journaled in horizontal cross support member 18 (FIG. 3). Pivot shaft 68 is caused to rotate by operation of dual-rod cylinder 70. As best shown in FIGS. 2 and 3, a first rod 72 of cylinder 70 is attached to frame 12. The second rod 74 is attached to drive arm 76 that rotates pivot shaft 68. Cylinder 70 may be hydraulic for a specific application but in the preferred embodiment it is an air cylinder. Rods 72 and 74 are retracted and extended by means of air pressure as supplied and regulated by a conventional air supply/regulator shown generally as 34 in FIG. 5. In the inactive state of the vehicle washing apparatus 10, the rack support arm 66 is aligned with horizontal cross member 18, which is perpendicular to the longitudinal axis of the vehicle. This "inactive" position is shown in FIGS. 1 and 2. In such position, a complete "see-through" entry and exit into and out of apparatus 10 is provided. Washing strips 62 are positioned to the sides of the apparatus and out of the path of a vehicle entering or exiting through frame 12.

Once the system is activated, first rod 72 is retracted to pull drive arm 76 and thus to rotate pivot shaft 68. This position is illustrated in FIG. 3. Retraction of rod 72 and rotation of pivot shaft 68 causes rack support arm 66, the racks 64 connected to it and the depending cleaning strips 62 to move through a first arc A to a first position where strips 62 come into contact with the vehicle. This first position is illustrated in FIG. 3 with rack support arm 66 and racks 64 shown in phantom. In this position, rack support arm 66 will be at an acute angle A to horizontal cross member 18. As frame 12 is moved on rails 45 over and along the length of the vehicle, second rod 74 is retracted to further rotate pivot shaft 68 and thus racks 64 and cleaning strips 62 through a second arc B to a second position. This second position is illustrated in FIG. 3 with the rack support arm 66 and racks 64 shown with solid lines. In this position, rack support arm 66 will be at an obtuse angle C to horizontal cross member 18. As cleaning strips 62 move through second arc B from their first position to their second position, they frictionally engage the vehicle along its width to clean a segment of the vehicle. As frame 12 continues to move over and along the vehicle, second rod 74 is alternately retracted and extended to reciprocate racks 64 and cleaning strips 62, thus cleaning different segments of the vehicle.

Figure 4:
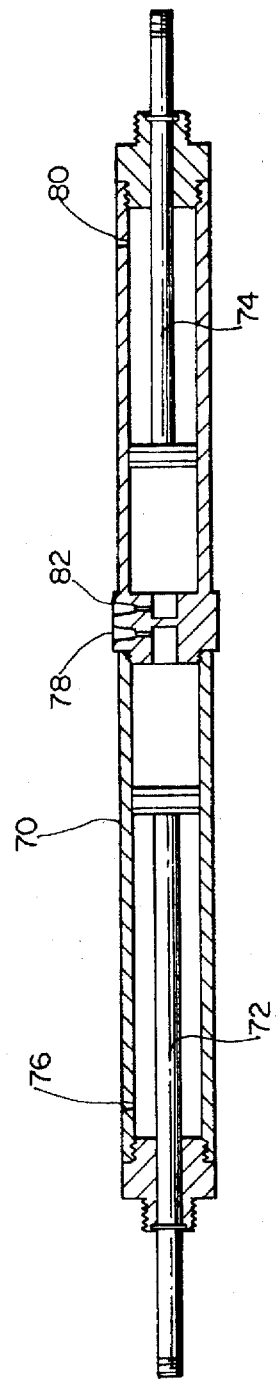
FIG. 4 is a partial cross-sectional view of the dual-rod cylinder of the present invention.

In a preferred embodiment, dual-rod cylinder 70 is an air cylinder but may be any known type of cylinder, such as hydraulic, for a specific application. Referring to FIG. 4, cylinder 70 provides separate air ports for each rod. Retraction air port 76 and extension air port 78 are provided for rod 72. Likewise, retraction port 80 and extension port 82 are provided for rod 74. With such dual-rod capability, the reciprocating action can be controlled separately from the action of bringing the cleaning strips out from the side of the frame. However, only one cylinder is required, thus reducing costs of parts, assembly and maintenance.

Figure 6:
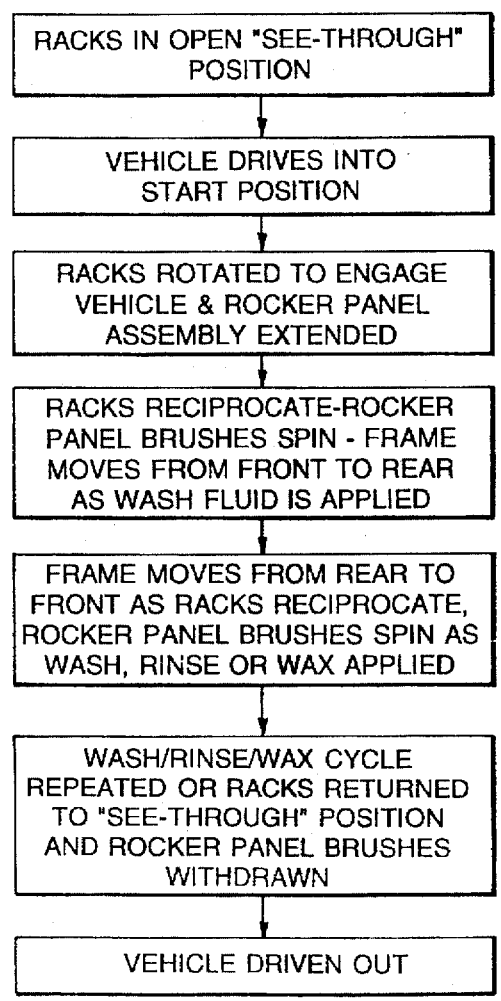
FIG. 6 is a general flow diagram showing the basic operation of the present invention.

FIG. 6 illustrates the basic operational flow, which can be varied in any number of ways to accommodate specific applications. Initially, the racks 64 are in the open or "see-through" position, i.e. as in FIGS. 1 and 2. This tunnel effect permits easy alignment of the vehicle as it drives into position in the washing apparatus. Once the vehicle is in position, racks 64 are rotated through arc A (FIG. 3) to engage the vehicle. Also, swing arms 50 of the rocker panel wash assembly 42 (FIG. 1) are moved inwardly toward the vehicle. Next, racks 64 are reciprocated through arc B (FIG. 3) and shafts 46 (FIG. 1) are rotated so that cleaning strips 62 and 44 frictionally engage the vehicle. At the same time, washing fluid is applied. While racks 64 reciprocate and shafts 46 spin, frame 12 moves over the vehicle along its length from front to rear. Once the frame 12 has moved along the entire length of the vehicle, it begins to reverse direction to move from back to front during which time additional wash fluid, clean rinse water or wax may be applied. When the frame has moved back to its initial "home" position at the front of the vehicle, another cycle (i.e. wash, rinse or wax) can be initiated or racks 64 are returned to their "see-through" position (FIGS. 1 and 2) and the vehicle is driven out with an unobstructed view.

The present invention provides an advantage over conventional vehicle wash systems with its unique "see-through" entry and exit feature. Such feature is made possible by a dual-rod cylinder that permits a single device to control the rack movement from the "see-through" position to the operational position and also control the reciprocating cleaning action of the racks. From the foregoing detailed description, it will be evident that there are a number of changes, adaptations and modifications of the present invention that will occur to those having ordinary skill in the art to which the invention pertains. However, it is intended that all such variations not departing from the spirit of the invention be considered within the scope thereof as limited solely by the appended claims.

We claim:

1. A method for operating vehicle washing apparatus that includes an arch frame, a rack support arm connected to said frame, at least one rack connected to said rack support arm, and a plurality of cleaning strips depending from said rack, comprising the steps of:

initially positioning said cleaning strips to a side of said frame to provide an unobstructed vehicle entry into said apparatus;

rotating said rack support arm to move said rack and to move said cleaning strips away from said side of said frame for contact with a vehicle, wherein said rotating step includes activation of a dual-rod cylinder in which each rod thereof is operable independently of the other.

2. A method for operating vehicle washing apparatus as in claim 1 wherein said activation of said dual-rod cylinder includes the step of retracting a first cylinder rod to rotate said rack support arm through a first arc.

3. A method for operating vehicle washing apparatus as in claim 2 wherein said activation of said dual-rod cylinder includes the step of retracting a second cylinder rod to rotate said rack support arm through a second arc.

4. A method for operating vehicle washing apparatus as in claim 3 wherein said step of retracting said first cylinder rod causes said rack support arm to move from a home position in alignment with a horizontal cross member of said frame through said first arc to a first active position at an acute angle to said horizontal cross member.

5. A method for operating vehicle washing apparatus as in claim 4 wherein said step of retracting said second cylinder rod causes said rack support arm to move from said first active position at an acute angle to said horizontal cross member through said second arc to a second active position at an obtuse angle to said horizontal cross member.

6. A method for operating vehicle washing apparatus as in claim 5 including the step of alternately retracting and extending said second cylinder rod to reciprocate said rack support arm.

7. A method for operating vehicle washing apparatus as in claim 6 including the step of moving said frame on rails along the length of a vehicle while said rack support arm reciprocates.

8. A method for operating vehicle washing apparatus as in claim 7 including the step of rotating rocker panel cleaning strips to clean the side of a vehicle while said frame moves and said rack support arm reciprocates.

9. A method for operating vehicle washing apparatus as in claim 8 including the step of swinging said rocker panel cleaning strips into a position away from said frame and near a vehicle prior to rotating said strips.

* * * * *